(12) United States Patent
Burrington et al.

(10) Patent No.: US 8,524,030 B2
(45) Date of Patent: Sep. 3, 2013

(54) FUEL TANK AND METHOD FOR REDUCING VAPOR PERMEATION THROUGH A FUEL TANK

(75) Inventors: Win S. Burrington, Rochester Hills, MI (US); James R. Osborne, Davisburg, MI (US); Steve L. Toth, Windsor (CA)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 0 days.

(21) Appl. No.: 13/469,247

(22) Filed: May 11, 2012

(65) Prior Publication Data

US 2012/0222806 A1     Sep. 6, 2012

Related U.S. Application Data

(62) Division of application No. 11/134,486, filed on May 20, 2005, now Pat. No. 8,381,928.

(60) Provisional application No. 60/576,977, filed on Jun. 4, 2004.

(51) Int. Cl.
    *B65D 88/02*     (2006.01)
    *B29C 65/02*     (2006.01)

(52) U.S. Cl.
    USPC ........................................ 156/309.6; 220/562

(58) Field of Classification Search
    USPC .............................. 156/309.6; 220/562, 683
    See application file for complete search history.

(56) References Cited

U.S. PATENT DOCUMENTS

| | | |
|---|---|---|
| 2,439,562 A | 4/1948 | Cunningham |
| 3,394,841 A | 7/1968 | Anderson |
| 3,606,958 A | 9/1971 | Coffman |
| 3,680,727 A | 8/1972 | Pearson |
| 3,695,050 A | 10/1972 | Bancroft |
| 3,779,420 A | 12/1973 | Knaus |
| 3,782,053 A | 1/1974 | Nakano et al. |
| 3,793,976 A | 2/1974 | Kleinmann |
| 4,004,706 A | 1/1977 | Guldenfels et al. |
| 4,123,582 A | 10/1978 | Musyt |
| 4,222,804 A | 9/1980 | Short |
| 4,284,674 A | 8/1981 | Sheptak |
| 4,440,824 A | 4/1984 | Bonis |
| 4,496,073 A | 1/1985 | Silver et al. |
| 4,552,281 A | 11/1985 | Schneider |
| 4,562,934 A | 1/1986 | Hammond |
| 4,735,855 A | 4/1988 | Wofford et al. |

(Continued)

FOREIGN PATENT DOCUMENTS

| EP | 1166892 | 9/2006 |
|---|---|---|
| JP | S 48-51076 | 7/1973 |

(Continued)

*Primary Examiner* — Katarzyna Wyrozebski Lee
*Assistant Examiner* — Scott W Dodds
(74) *Attorney, Agent, or Firm* — Reising Ethington P.C.

(57) ABSTRACT

A method of reducing fuel vapor permeation through a multi-layer tank includes providing a multi-layer overlay onto at least a portion of a structural layer of the multi-layer tank. The multi-layer overlay preferably comprises at least one structural layer composed of a polymeric material that is compatible with one or more of the polymeric structural layer(s) of the multi-layer tank. The multi-layer overlay further comprises at least one barrier layer composed of a vapor barrier material resistant to hydrocarbon permeation therethrough. The multi-layer overlay may be secured to the multi-layer tank by, for example, applying a suitable amount of heat and pressure thereto or by molding the multi-layer overlay to the tank body during a tank forming process.

6 Claims, 5 Drawing Sheets

(56) References Cited

U.S. PATENT DOCUMENTS

| | | |
|---|---|---|
| 4,785,955 A | 11/1988 | Sasaki |
| 4,977,022 A | 12/1990 | Mueller |
| 5,011,720 A | 4/1991 | Jabarin |
| 5,072,623 A | 12/1991 | Hendershot |
| 5,093,208 A | 3/1992 | Heyes et al. |
| 5,129,544 A | 7/1992 | Jacobson |
| 5,149,389 A | 9/1992 | Heyes et al. |
| 5,169,697 A | 12/1992 | Langley et al. |
| 5,186,875 A | 2/1993 | Fukuhara |
| 5,389,448 A | 2/1995 | Schirmer et al. |
| 5,464,116 A | 11/1995 | Aoki |
| 5,547,096 A | 8/1996 | Kleyn |
| 5,567,296 A | 10/1996 | Luch |
| 5,691,016 A | 11/1997 | Hobbs |
| 5,879,498 A | 3/1999 | Lemons |
| 6,033,749 A | 3/2000 | Hata et al. |
| 6,068,933 A | 5/2000 | Shepard et al. |
| 6,218,024 B1 | 4/2001 | Tamber et al. |
| 6,391,412 B1 | 5/2002 | Hata et al. |
| 6,395,357 B1 | 5/2002 | Abu-Isa |
| 6,409,040 B1 | 6/2002 | Distelhoff et al. |
| 6,467,643 B1 | 10/2002 | Sadr |
| 6,491,180 B2 | 12/2002 | Distelhoff et al. |
| 6,586,064 B1 | 7/2003 | Abu-Isa |
| 6,589,620 B1 | 7/2003 | Abu-Isa |
| 6,596,356 B1 | 7/2003 | Short |
| 6,613,408 B1 | 9/2003 | Short |
| 6,616,994 B2 | 9/2003 | Van Schaftingen et al. |
| 6,715,626 B2 | 4/2004 | Balzer et al. |
| 6,719,163 B1 | 4/2004 | Delbarre et al. |
| 6,722,521 B2 | 4/2004 | Potter et al. |
| 6,733,048 B2 | 5/2004 | Kurihara et al. |
| 6,737,132 B1 | 5/2004 | Michihata et al. |
| 6,811,739 B2 | 11/2004 | Sadr |
| 6,843,267 B1 | 1/2005 | Van Schaftingen et al. |
| 6,877,627 B2 | 4/2005 | Brandner et al. |
| 6,969,485 B2 | 11/2005 | Vorenkamp et al. |
| 6,989,198 B2 | 1/2006 | Masuda et al. |
| 7,105,121 B2 | 9/2006 | Sadr |
| 7,134,426 B2 | 11/2006 | Uchino et al. |
| 7,165,698 B2 | 1/2007 | Immel et al. |
| 7,208,210 B2 | 4/2007 | Michihata et al. |
| 7,211,307 B2 | 5/2007 | Potter et al. |
| 7,278,439 B2 | 10/2007 | Gerard et al. |
| 7,473,451 B2 | 1/2009 | Micihihata et al. |
| 7,584,864 B2 | 9/2009 | Yamamoto et al. |
| 7,600,652 B1 | 10/2009 | Johansen |
| 2001/0045433 A1 | 11/2001 | Ellis |
| 2002/0017745 A1 | 2/2002 | Vorenkamp et al. |
| 2002/0051856 A1 | 5/2002 | Delbarre |
| 2002/0053566 A1 | 5/2002 | Balzer et al. |
| 2003/0062656 A1 | 4/2003 | Sadr |
| 2003/0198768 A1 | 10/2003 | Delbarre |
| 2003/0209550 A1 | 11/2003 | Potter et al. |
| 2004/0009315 A1 | 1/2004 | Potter et al. |
| 2004/0170786 A1 | 9/2004 | Michihata et al. |
| 2004/0220337 A1 | 11/2004 | Tsutsumi et al. |
| 2004/0227273 A1 | 11/2004 | Sadr |
| 2005/0112312 A1 | 5/2005 | Baumert et al. |
| 2005/0140052 A1 | 6/2005 | Brandner et al. |
| 2007/0254172 A1 | 11/2007 | Kanazawa et al. |

FOREIGN PATENT DOCUMENTS

| | | |
|---|---|---|
| JP | S 62137725 | 8/1987 |
| JP | H 02-41211 | 2/1990 |
| JP | 04-072135 | 3/1992 |
| JP | 2001-163321 | 6/2001 |
| KR | 2001-10066074 | 7/2001 |

FUEL TANK AND METHOD FOR REDUCING VAPOR PERMEATION THROUGH A FUEL TANK

REFERENCE TO RELATED APPLICATION

This application is a division of copending U.S. patent application Ser. No. 11/134,486, filed May 20, 2005. Applicants claim priority of application Ser. No. 11/134,486 and provisional patent application Ser. No. 60/576,977, filed Jun. 4, 2004.

FIELD OF THE INVENTION

The present invention relates generally to fuel tanks and, more particularly, to a method of reducing vapor permeation through a multi-layer fuel tank.

BACKGROUND OF THE INVENTION

Multi-layer polymeric fuel tanks are often used in the automotive industry because they are lighter in weight, have greater flexibility and are cheaper to manufacture than fuel tanks made of metal. Multi-layer polymeric fuel tanks typically include a tank wall composed of at least two layers of a high density polyethylene (HDPE) structural material and an ethylene vinyl alcohol copolymer (EVOH) hydrocarbon vapor barrier layer disposed between them. The fuel tanks may be manufactured by, for example, co-extruding the multiple layers into two sheets and vacuum forming each sheet to form two complementary sections or halves of the fuel tank, blow molding coextruded parisons into two shell sections of the fuel tank, blow-molding a coextruded cylindrical parison, or other fuel tank manufacturing processes known in the art. Component parts of a fuel system, such as a spout, a fuel pump, a vent valve, a weld cap and/or a fuel level sensor may be disposed in or on one or both sections of the tank, or may be disposed in or on one or more openings in the parison. The molded halves of the fuel tank or the openings in the parison may then be welded together and/or pinched closed. The welded junctures and the pinched regions form seams in the tank wall with a discontinuous EVOH barrier layer in those regions, thereby creating permeation windows through which fuel vapors pass more easily through the tank wall and to the atmosphere.

SUMMARY OF THE INVENTION

A method of reducing fuel and fuel vapor permeation through a multi-layer tank comprises providing a multi-layer overlay on a polymeric structural layer of the multi-layer tank and over at least a portion of a vapor permeable seam formed in the tank. The multi-layer overlay comprises at least one barrier layer composed of a vapor barrier material that is resistant to vapor permeation therethrough. The multi-layer overlay further comprises at least one structural layer composed of a polymeric structural material that is compatible with one or more of the polymeric structural layer(s) of the multi-layer tank. The multi-layer overlay may be secured to the polymeric structural layer of the multi-layer tank by applying pressure and heat thereto or by molding the overlay to the tank surface during a tank forming process.

One presently preferred embodiment of a multi-layer fuel tank includes a multi-layer wall comprising at least one polymeric structural layer, at least one seam formed in the multi-layer wall and a multi-layer overlay carried by the multi-layer wall and disposed over at least a portion of the seam. The multi-layer overlay comprises at least one barrier layer composed of a barrier material that is resistant to vapor permeation therethrough. The multi-layer overlay further comprises at least one structural layer composed of a polymeric structural material that is compatible with an adjacent polymeric structural layer of the multi-layer tank.

Objects, features and advantages of this invention include providing a fuel tank that has improved resistance to fuel and fuel vapor permeation therethrough, is rugged, durable, of relatively simple design and economical manufacture, and a method of reducing fuel and fuel vapor permeation through a fuel tank that is relatively simple, inexpensive and efficient for the manufacture and production of fuel tanks.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF PRESENTLY PREFERRED EMBODIMENTS

Figure 3:
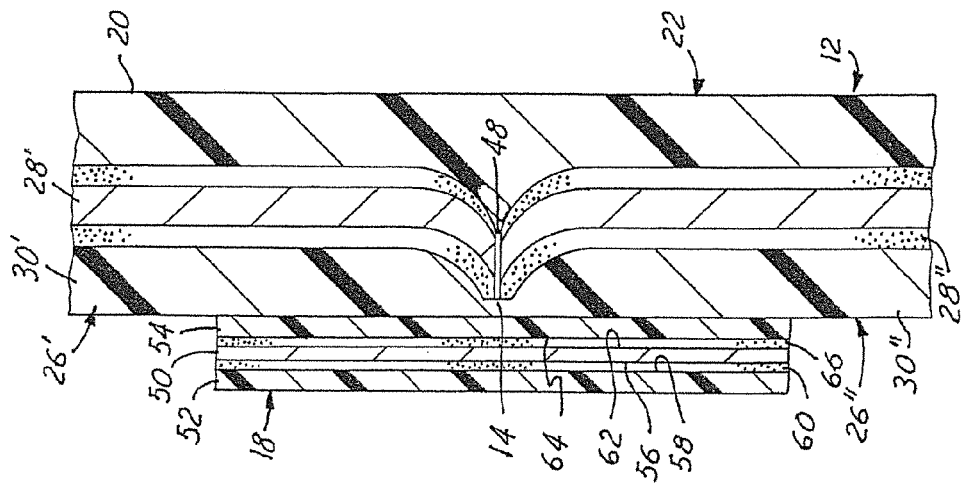
FIG. 3 is a fragmentary cross-sectional view taken generally along line 3-3 in FIG. 1.
Figure 1:
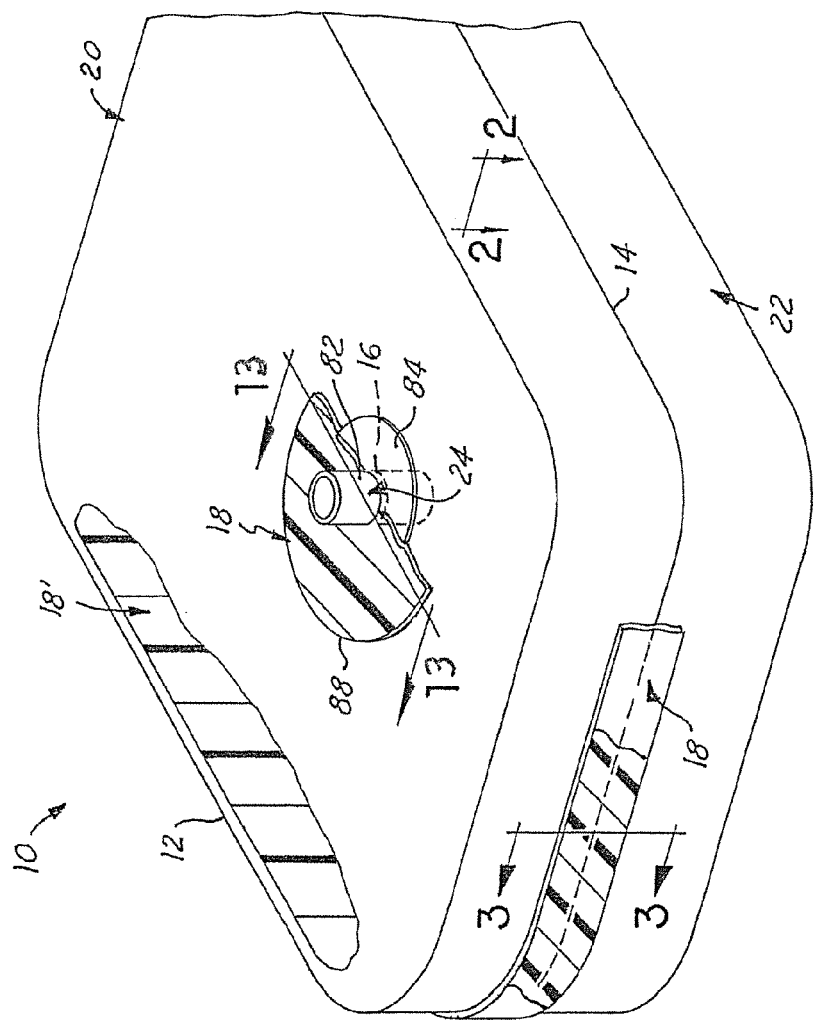
FIG. 1 is a perspective view of a portion of an assembled multi-layer fuel tank showing a component weld seam, a pinch seam and a surface of the fuel tank body partially sealed by portions of a multi-layer overlay.
Figure 2:
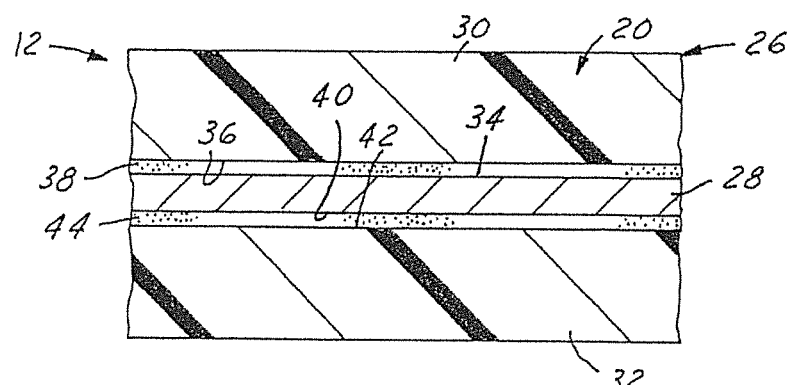
FIG. 2 is a fragmentary cross-sectional view taken generally along line 2-2 of FIG. 1.

Referring in more detail to the drawings, FIG. 1-3 illustrate a fuel tank assembly 10 comprising a fuel tank body 12 having a tank wall 26 with two weld seams 14, 16, where vapor permeation through the tank wall 26 is reduced by covering at least a portion of the fuel tank wall and the weld seams 14, 16 with a nonpermeable multi-layer overlay 18. The multi-layer overlay 18 includes a barrier material that prevents or substantially inhibits hydrocarbon fuel and fuel vapor permeation through the fuel tank wall, particularly through the seams 14, 16. The multi-layer overlay 18 may be provided in the form of a tape, strip, sheet or any other suitable form, and can be cut or shaped into any desired size and/or shape for covering any hydrocarbon permeable seam or surface area formed in an area or region of the fuel tank assembly 10 or for covering any desired surface area of the tank wall. The overlay 18 may be secured to the tank body 12 by applying pressure and heat thereto or by molding the overlay 18 to the tank body 12 during the fuel tank molding or forming process.

As shown in FIG. 1, the overlay 18 may be cut into a strip for sealing the seam 14 which is a pinch seam fainted when two molded shells or halves 20, 22 of the fuel tank body 12 were welded together. Also shown in FIG. 1, the overlay may be die-cut into a disc 18' for sealing the seam 16, which is a circular component weld seam formed when a component part, such as a spout 24, is welded to the tank body 12. Also shown in FIG. 1, the overlay 18' may be die-cut to cover a desired a surface area of the fuel tank wall to provide an additional barrier to vapor permeation through the tank wall. Of course, other vapor permeable areas may be present in a fuel tank, including by way of example and without limitation, pinch seams formed when blow molding a fuel tank from a hollow, cylindrical, multi-layer plastic parison.

The fuel tank body 12 comprises a tank wall 26 that preferably is made of three or more co-extruded layers. As shown in FIG. 2, the fuel tank wall 26 is composed of five layers including a hydrocarbon barrier layer 28 sandwiched between two structural layers; an outer-most structural layer 30 and an inner-most structural layer 32. The barrier layer 28 has an outer surface 34 that is adhered to an inner surface 36 of the outer-most structural layer 30 by a first bonding layer 38 composed of an adhesive material. The barrier layer 28 further has an inner surface 40 that is adhered to an outer surface 42 of the inner-most structural layer 32 by a second bonding layer 44, also composed of an adhesive material. Use of the five-layer construction of the tank wall 26 is merely for illustrative purposes in describing the method of the present invention, other multi-layer tank wall constructions and configurations may also be used in, by way of example, three, four or six-layer or other tank wall configurations.

The structural layers 30, 32 of the tank wall 26 are composed of a suitable polymeric material to provide structural integrity to the fuel tank assembly 10. Typically, the tank wall of multi-layer fuel tanks includes at least one structural layer, but more commonly, comprises two or more structural layers. As shown in FIG. 2, the fuel tank wall 26 comprises two structural layers 30, 32, one or both of which may be formed from treated recycled polymeric material consisting essentially of a mixture of waste and/or scrap material left over from the manufacture of previous fuel tanks. Such polymeric material is often referred to as re-grind material. One or both structural layers 30, 32 can also be formed from virgin high density polyethylene (HDPE). In some fuel tanks, an intermediate layer of re-grind or recycled material may be used, for example, between an adhesive layer and one of the inner or outer structural layers providing a six-layer fuel tank construction.

Although the HDPE-containing structural layers 30, 32 are structurally suitable for fuel tanks, they have very poor hydrocarbon permeation or vapor barrier properties. Thus, the barrier layer 28 is incorporated into the multi-layer structure of the tank wall 26 to prevent or greatly inhibit hydrocarbon vapors from permeating through the tank wall 26. Since the preferred barrier material for the barrier layer 28 of the multi-layer fuel tank wall 26 is a relatively expensive ethylene vinyl alcohol copolymer (EVOH), a very thin layer of this material is incorporated between the structural layers 30, 32 and is adhered to the structural layers 30, 32 using an adhesive material that makes up the bonding layers 38, 44. Suitable adhesives for use in fuel tank construction include modified polyethylene materials or other adhesives known in the art.

As previously mentioned in conjunction with FIG. 1, the fuel tank body 12 may be manufactured by welding together two pre-molded fuel tank shells or halves 20, 22. The fuel tank halves 20, 22 are each separately manufactured by first co-extruding the multiple layers of the fuel tank wall 26. Then each half 20, 22 is formed using a blow molding, a vacuum forming, or another suitable tank-forming method. Additional component parts to complete the fuel tank assembly 10, such as the spout 24, a fuel pump (not shown), a vent valve, a weld cap and/or a fuel level sensor (all of which are not shown in FIG. 1), are then welded to or otherwise assembled or disposed in the appropriate areas either inside or outside the fuel tank body 12. Then the two halves 20, 22 of the tank body 12 are connected together by joining peripheral edges of each half 20, 22 and thermal welding them together. One or more welding cycles of heat is preferably applied to the entire periphery of the joined edges of the halves 20, 22 to thereby form the seam 14.

As shown in FIG. 3, the welded pinch seam 14 joins the outer-most structural layer 30' of the tank wall 26' in the first half 20 of the tank body 12 to the outer-most structural layer 30" of the tank wall 26" in the second half 22 of the tank body 12 to thereby form a single, continuous structural layer that becomes, as shown in FIG. 1, the outer-most structural layer 30 of the fuel tank wall 26. In reference again to FIG. 3, the barrier layers 28', 28" each located underneath their respective structural layers 30', 30" of the two halves 20, 22 typically do not completely join together after welding the two halves 20, 22 together, thereby leaving a gap or permeation window 48 along at least a portion of the pinch seam 14. The size of the permeation window 48 is exaggerated in FIG. 3, as are the thicknesses of the multiple layers of the tank wall 26 and the overlay 18 for descriptive purposes. Typically, the permeation window 48 is quite small, but large enough to permit hydrocarbon vapors to permeate through the pinch seam 14 at a significant rate. This is true, at least in part, for blow molded tanks formed from co-extrusion of a cylindrical parison. It should be noted, however, that for vacuum-formed tanks or tanks formed by joining two or more sections together, the permeation window 48 may be much larger because the region between the barrier layers is larger. A method, as will be described, is suitable for covering and/or sealing weld or pinch seams formed in the manufacture of fuel tanks, as well as covering and/or sealing other portions of the fuel tank, including without limitation, fuel tank areas having a gap in a barrier layer, or a thin barrier layer, or otherwise as desired.

One presently preferred embodiment of a method of controlling vapor permeation in a fuel tank includes applying a piece of the multi-layer overlay 18 to the fuel tank body 12 along and over a vapor permeable seam, such as the pinch seam 14 or the component weld seam 16, as shown in FIG. 1, to thereby form a fuel and fuel vapor permeation seal. As shown in FIG. 3, a piece of the multi-layer overlay 18 may include five layers including a vapor barrier layer 50 sandwiched between two structural layers; an outer-most structural layer 52 and an inner-most structural layer 54. This configuration is substantially similar to the five-layer arrangement of the fuel tank wall 26 shown in FIG. 2. As shown in FIG. 3, the barrier layer 50 includes an outer surface 56 that is adhered to an inner surface 58 of the outer-most structural layer 52 by a first bonding layer 60 composed of an adhesive material. The barrier layer 50 further includes an inner surface 62 that is adhered to an outer surface 64 of the inner-most structural layer 54 by a second bonding layer 66, also composed of an adhesive material.

The barrier layer 50 of the multi-layer overlay 18 is preferably composed of EVOH or any other suitable hydrocarbon vapor barrier material. The structural layers 52, 54, may be composed of any number of suitable structural materials known in the art. The inner-most structural layer 54 of the overlay 18 is preferably composed of a structural material that is compatible (e.g., weldable or bondable) with the outer-most structural layer 30 of the fuel tank wall 26. Since the structural material of the outer-most structural layer of most multi-layer fuel tanks includes HDPE, which is chemically not adhesive to most, if not all, other materials, the inner-most structural layer 54 of the overlay 18 is preferably composed of HDPE as well. This promotes adhesion or bonding between the overlay 18 and the fuel tank body 12 in the presence of heat treatment or other adhesion promoting processes. The outer-most structural layer 52 of the overlay 18 may include any suitable structural material. As an example, in the overlay 18 provided in FIG. 3, the outer layer 52 is made of polyethylene including a foaming or blowing agent. This material composition provides the overlay 18 with some contact resistance to prevent tearing of the overlay 18 and further environmentally protects and structurally reinforces the seam 14 to which the overlay 18 is applied.

Other representative examples of available multi-layer overlays that can suitably be used in the method of the present invention include, without limitation, three or five-layer configurations. Not inclusively, the polymeric barrier layer 50 may be replaced by a metallic barrier strip or layer made of, for example, aluminum. A suitable multi-layer overlay according to one presently preferred implementation includes a polyester-polyethylene-aluminum-polyester-polyethylene five-layer overlay commercially available from Unipac Corp. Other suitable multi-layer overlays include a polyethylene-adhesive-EVOH-adhesive-polyethylene five-layer overlay, a polyethylene-adhesive-metal-adhesive-polyethylene five-layer overlay or other overlays of similar construction. Such multi-layer overlays are available as either a thin roll or as a wide sheet that can be cut into the desired size and shape.

The choice between a polymeric barrier layer and a metallic barrier layer can depend at least in part upon the method by which the overlay 18 will be adhered to the fuel tank body 12. Overlays including a polymeric barrier layer may be adhered to the tank wall 26 by physical heating methods, such as hot rolling, whereas overlays including a metallic barrier layer may be adhered to the tank body 12 by electrical heating methods, such as induction. These methods will later be discussed in more detail.

Prior to sealing a weld or pinch seam formed in a multi-layer fuel tank body, the seam can be assessed for rough edges that may have been formed during a pinching or welding process. For example, a flash trim is often formed when forming a pinch seam between two halves of a fuel tank body or when pinching closed an end of a cylindrical extruded parison. The flash trim can be a relatively sharp protrusion of polymeric material that follows all or at least one or more sections of the periphery of the pinch seam. This trim flash is undesirable because it may tear or slice the overlay when applied thereto, or inhibit close attachment of the overlay to the tank, thereby hindering and weakening the vapor seal.

To remove the trim flash and smooth the pinch seam 14, a pre-treatment step may be performed. One potential pre-treatment step includes applying a flame from, for example, a flame torch to the flash trim along the periphery of the pinch seam 14 until the flash trim is removed and the seam 14 is smooth. The flame may be applied continuously until the flash trim is removed or may be applied in cycles. Other non-smooth surfaces, for example, formed from component weld seams may also be treated with the flame. Although optional, the advantage of using the pre-treatment process, besides smoothing the surfaces of the weld seams for better vapor sealing effect, includes further ionizing the HDPE surface thereby making it slightly more adhesive. Thus, the HDPE inner-most structural layer 54 of the overlay 14 can be better attached to the fuel tank wall 26 for better adhesion of the overlay 18 thereto.

Application of pressure and heat to the overlay 18 to achieve a good vapor seal over a welded seam of a fuel tank, in accordance with one presently preferred aspect of the present invention, can be achieved by a variety of different processes, some of which are shown in FIGS. 4-9. It should be appreciated that these processes are not inclusive and other processes may be employed. The processes shown in FIGS. 4-8 will be described in sealing the pinch seam 14 whereas the process shown in FIG. 9 will be described in sealing an arbitrarily selected surface area of the fuel tank body 12. Any one of the processes shown in FIGS. 4-9, however, may be used to seal any seam or any selected surface area on the fuel tank body 12.

Figure 4:
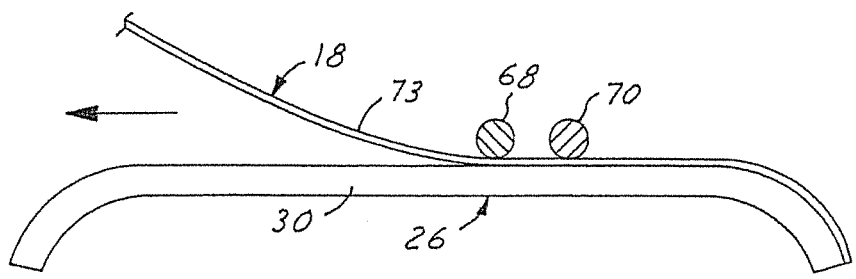
FIG. 4 is a somewhat schematic view of the multi-layer overlay being secured to the fuel tank using a single compression roller and a high temperature roller.
Figure 5:
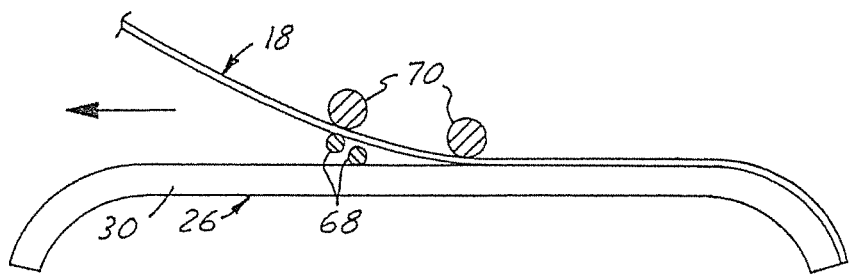
FIG. 5 is a somewhat schematic view of the multi-layer overlay being secured to the fuel tank using multiple compression rollers and high temperature rollers.
Figure 6:
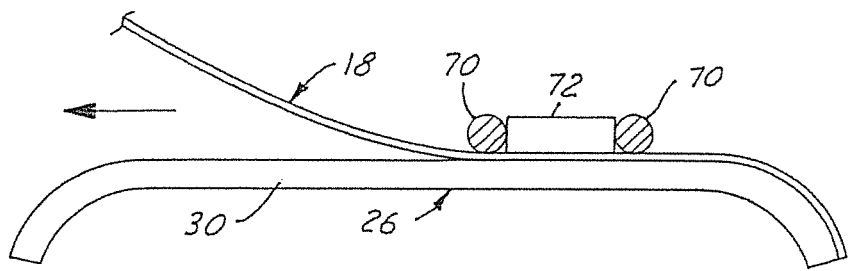
FIG. 6 is a somewhat schematic view of the multi-layer overlay being secured to the fuel tank using compression rollers and an induction coil.

In applying the overlay to the fuel tank, the multi-layer overlay 18 is prepared by cutting a piece that will conform to the shape of the pinch seam 14 and is large enough to form an adequate hydrocarbon vapor seal. As shown in FIG. 4-6, the multi-layer overlay 18 may be applied to the tank wall 26 by press rolling the overlay 18 on the outer structural layer 30 of the tank wall 26 in the presence of a heating device. Generally, for all of the disclosed processes and apparatus, the amount of heat to be administered to the overlay 18 to form a suitable seal is about 200° C. to about 270° C. In reference to FIG. 3 in conjunction with FIGS. 4-6, an adhesive bond is formed between the structural layer 54 of the overlay 18 and the structural layer 30 of the tank wall 26 and in all of the disclosed processes and apparatus is strengthened by applying a pressure of at least 5 psi to the heated area to urge the overlay into engagement with the structural layer.

As shown in FIG. 4, the overlay 18 preferably is adhered to the tank wall 26 by simultaneously applying heat and pressure to the top surface 73 of the overlay 18 along the length of the pinch seam (not shown) using a high temperature roller 68. The high temperature roller 68 supplies enough heat that will travel through the multiple layers of the overlay 18 and effectively heat the inner-most structural layer (not shown) of the overlay 18 and the mating layer 30', 30" of the tank wall to a temperature in the range of about 200° C. to 270° C. A pressure roller 70 then follows the high temperature roller 68 to strengthen the adhesive bond between the overlay 18 and the outer structural layer 30 of the tank wall 26. Alternatively, an adhesive bond may be formed between the overlay 18 and the tank wall 26 using two high temperature rollers 68, where one roller heats the outer-most structural layer 30 of the tank wall 26 and the other roller heats the inner-most structural layer (not shown) of the overlay 18, which is shown in FIG. 5, or the pre-treatment flame process as described above may supply enough heat to bond the overlay to the tank wall and only pressure need then be applied (not shown). For multi-layer overlays including a metallic barrier layer, heat may be applied using induction heating and thus the heating device may be an induction coil 72, as generally shown in FIG. 6.

Figure 7:
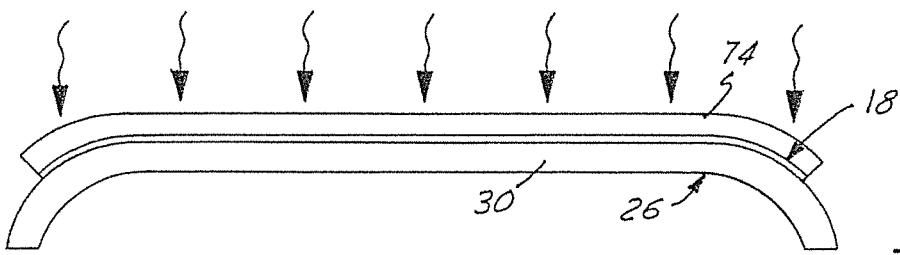
FIG. 7 is a somewhat schematic view of the multi-layer overlay being secured to the fuel tank using a heated platen.
Figure 8:
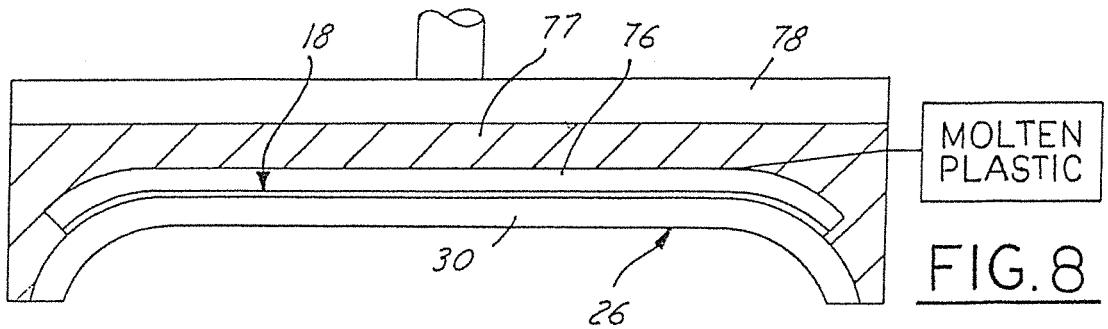
FIG. 8 is a somewhat schematic view of the multi-layer overlay being secured to the fuel tank using a hot drop manifold and an injection molding apparatus.

Alternative bonding methods may be used in adhering the overlay 18 to the tank wall 26 along a welded or pinched seam, examples of which are shown in FIGS. 7-8. As shown in FIG. 7, a pre-cut piece of overlay 18 may be placed over the welded seam and a heated platen 74, which is a heated sheet of pre-formed geometry mimicking the shape of tank wall 26, may then be placed thereover. The heated platen 74 may operate as both a heating device and a pressure device for properly sealing the overlay 18 along the weld seam 14.

As shown in FIG. 8, a pre-formed hotdrop manifold or a hot tip runner 77 having a geometry mimicking the shape of the tank wall 26 may be placed over the overlay 18, preferably leaving a space 76 of a couple millimeters between them. Relatively low pressure of about 50 psi from a plastic injection molding press 78 is applied to the overlay to initially bond the overlay 18 to the outer-most structural layer 30 of the overlay wall 26. Then a molten plastic, preferably a polyethylene based resin having a high melt flow property, is injected into the space, which heats up the overlay and allows it to bond to the surface of the tank wall 26. The plastic layer remains on the surface of the overlay 18, thereby providing a protective barrier or shield over the overlay 18.

Figure 9:
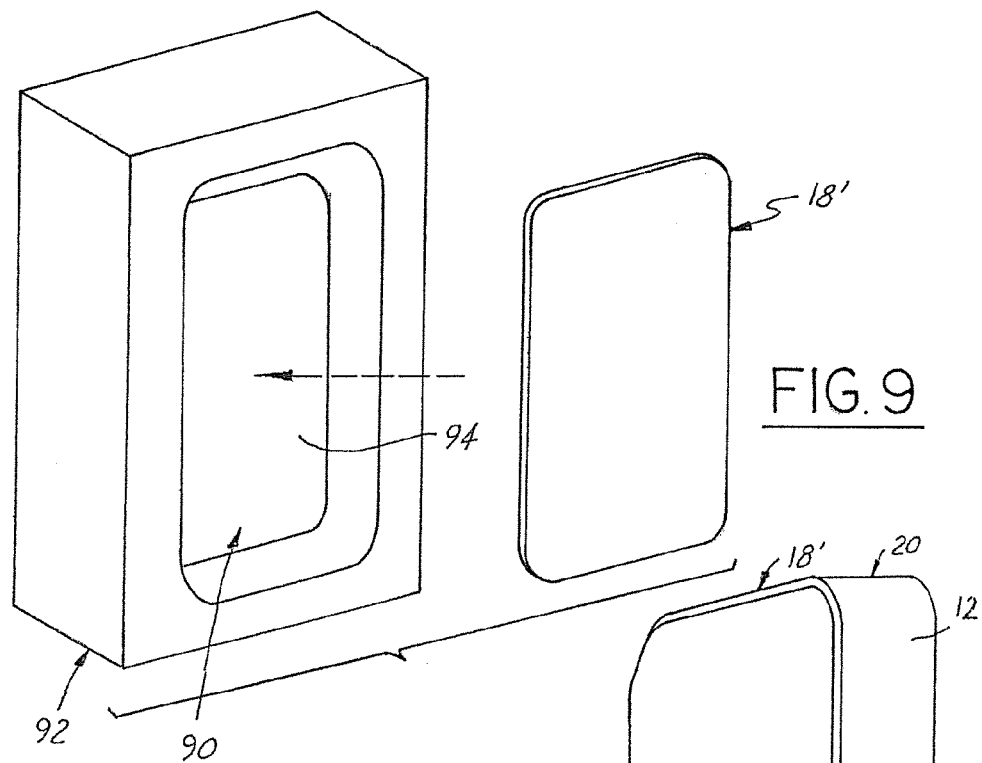
FIG. 9 is a perspective view of a mold for molding a fuel tank shell or half, where the mold includes a cavity in which a die-cut piece of a flat overlay is placed within for molding the overlay to the surface of the fuel tank shell body during the fuel tank molding or forming process.
Figure 10:
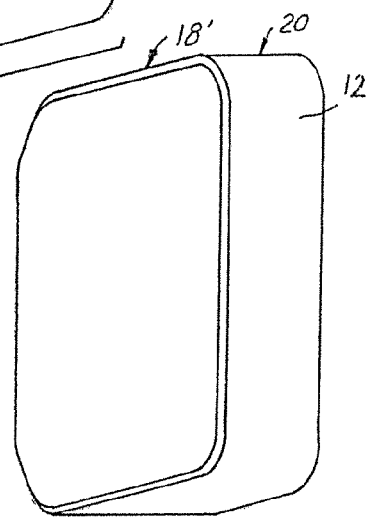
FIG. 10 is a perspective view of the formed fuel tank shell or half having the multi-layer overlay of FIG. 9 molded to a surface thereof.

The multi-layer overlay 18 may also be adhered to the surface of the fuel tank wall 26 by molding, such as insert molding the overlay 18 to the fuel tank during the fuel tank molding or forming process, where the overlay 18 will act as an additional barrier layer to vapor permeation through the tank wall 26. As shown in FIG. 9, a sheet or piece 18' of the multi-layer overlay is die-cut to a size that is just slightly smaller than the top surface of the fuel tank body 12. The multi-layer overlay 18' is placed within a cavity 90 of a mold 92 against a pre-determined desired surface, such as a bottom surface 94 of the mold cavity 90, and may be held in place, for example, by vacuum (not shown) or by any other suitable means. As shown in FIG. 9, the overlay 18 is cut to a desired size so that the overlay 18 covers the desired surface area of the tank body 12, as shown in FIG. 10, or in the cut-away portion of the overlay 18' disposed on the top surface of the tank body 12, as shown in FIG. 1.

Figure 11:
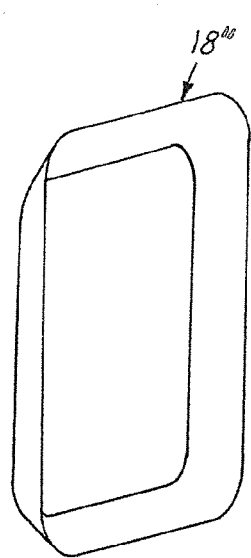
FIG. 11 is a perspective view of an alternate embodiment multi-layer overlay die-cut to correspond or conform to a surface or surfaces of the fuel tank shell body during the fuel tank molding or forming process.
Figure 12:
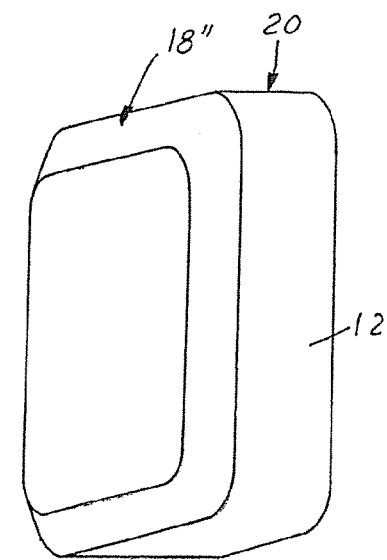
FIG. 12 is a perspective view of the multi-layer overlay of FIG. 11 molded or formed onto the surface of the fuel tank shell.

Alternatively, as shown in FIGS. 11 and 12, an overlay 18" may be concave or otherwise shaped to facilitate application of the overlay 18" to the corresponding portion of the fuel tank. The overlay 18, 18', 18" may extend around or over one or more corners where the fuel tank barrier layer may be further stretched as the tank is formed and hence, may be thinner than adjacent areas. The overlay 18, 18', 18" which may include perforations to allow the release of air that may become trapped between the overlay and tank, may be molded to the tank body 12 during the vacuum forming, injection molding, blow molding, or other known fuel tank molding or fuel tank forming process.

The overlay 18, 18', 18" may be formed with detailed or contoured surface features to match the fuel tank shell and may further include holes or cut-outs (not shown) for welding other fuel tank components to the fuel tank, such as a filler pipe or other fuel module interface components. Also, the size and shape of the overlay 18, 18', 18" whether flat or cup-shaped, may be varied to cover a variable amount of surface area of the fuel tank shell. The molded overlay 18 permits the coverage of larger surface areas of the tank body 12 with the same type of permeation reduction as would be experienced with pinch or component weld seams, such as seams 14, 16 as shown in FIG. 1.

Figure 13:
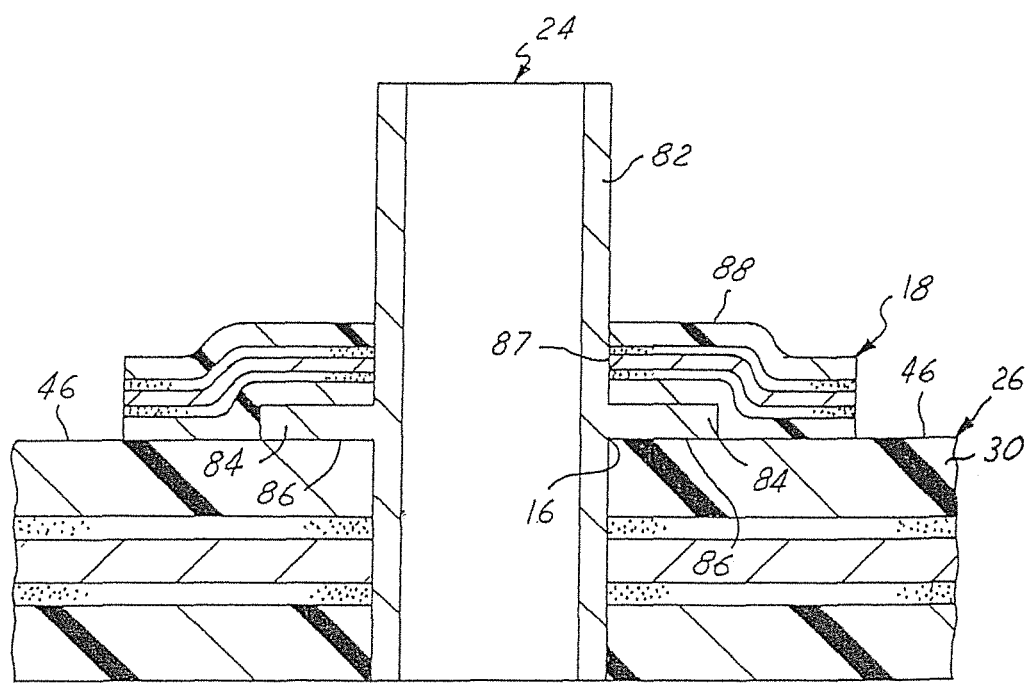
FIG. 13 is a fragmentary cross-sectional view taken generally along line 13-13 in FIG. 1 of a spout of the multi-layer polymeric fuel tank.

Component weld seams may also be sealed with a multi-layer overlay, as shown in FIG. 13. In reference to FIG. 13, the spout 24 comprises a neck 82 and a flange 84, both of which are composed of polyethylene material that, in general, has low resistance to hydrocarbon vapor permeation. A component weld seam 16 exists between a bottom surface 86 of the flange 84 and outer-most structural layer 30 of the tank wall 26. As better shown in FIG. 1, the multi-layer overlay 18 is die-cut into an annular disc having a hole 87 (shown in FIG. 13) formed in its center that is sized to receive the neck portion 82 of the spout 24. The disc comprises a body 88 that is radially large enough to encircle the flange 84 of the spout 24. Using the same methods as described above, depending of course upon the barrier material used in the multi-layer overlay, the overlay 18 can be bonded or otherwise attached to the fuel tank to seal the component weld seam 16. The overlay may also be used with other components mounted on or carried by the fuel tank, including, for example, vent valves and fuel pump modules which may have flanges that overlie and are coupled to the fuel tank. The overlay may also cover plugs or caps that close holes in the fuel tank, as well as anywhere else desirable, including on or over tubes, pipes or other fittings in a fuel system or associated with a fuel tank.

Figure 14:
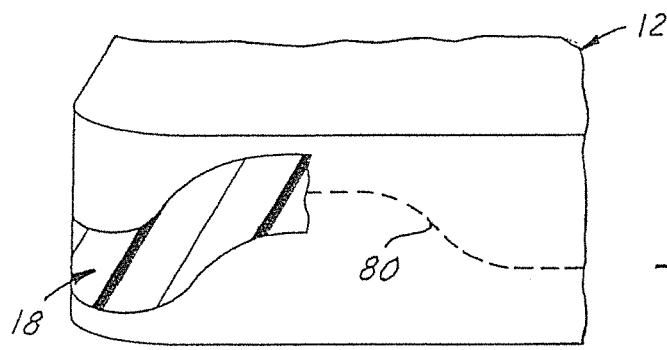
FIG. 14 is a fragmentary perspective view of a corner of the multi-layer fuel tank showing a portion of a convoluted pinch seam covered by a multi-layer overlay.

As previously mentioned, the multi-layer overlay 18 may be provided as a roll or as a sheet of material, as examples. For sealing straight-lined pinch seams, like pinch seam 14 shown in FIG. 1, the roll of overlay provides relatively thin or flat strips of overlay material that will suitably cover the pinch seam 14 and create a suitable hydrocarbon vapor seal. Sometimes, however, the fuel tank has a somewhat convoluted shape and thus also has a convolutedly-shaped pinch seam 80, such as shown in FIG. 14. Application of the straight-edge multi-layer overlay provided in the roll to the convolutedly-shaped pinch seam 80 will pose some difficulties. In such cases, the overlay 14 may be obtained as a sheet rather than as a roll and the sheet may then be die-cut to the desired shape of the seam 80 for proper coverage of the area to be sealed. This is also true for sealing component weld seams, which are commonly circular in shape, such as the component weld seam 16 formed by welding the spout 24 to the tank body 12 shown in FIGS. 1 and 13. This also is true for sealing surface areas of the tank body 12 using either a relatively flat overlay 18' as shown in FIG. 9 or a shaped or contoured overlay 18" as shown in FIG. 11.

Accordingly, permeation windows often formed in pinch or weld seams formed in multi-layer polymeric fuel tanks can be covered by a multi-layer overlay or substrate that spans any gaps in adjacent barrier layers in the area of the seams to prevent or reduce hydrocarbon vapor permeation through the fuel tank. Also, the fuel tank body 12 may be covered with a large piece of the overlay 18 to provide an additional barrier to vapor permeation through the tank wall 26. The method may be performed with commercially available materials and is relatively inexpensive to carry out.

While the forms of the invention herein disclosed constitute presently preferred embodiments, many others are possible. It is not intended herein to mention all the possible equivalent forms or ramifications of the invention. For example, the term "overlay" is not intended to be limited to an overlay or sheet and furthermore is not intended to be limited to disposal on the exterior surfaces of the tank wall but may also be disposed on interior surfaces of the tank wall as well. It is understood that terms used herein are merely descriptive, rather than limiting, and that various changes may be made without departing from the spirit and scope of the invention as defined by the following claims.

The invention claimed is:

1. A method of reducing fuel vapor permeation through a polymeric multi-layer fuel tank comprising:

forming a multi-layer polymeric fuel tank having a wall defining an enclosure in which a hydrocarbon fuel is stored with the wall having a hydrocarbon fuel vapor permeation barrier layer which is discontinuous at a seam and at least one polymeric structural layer outboard of and adhered to the barrier layer;

providing a separate overlay having a hydrocarbon fuel vapor permeation barrier layer of a polymeric or metal material resistant to hydrocarbon fuel vapor permeation therethrough and at least one polymeric structural layer adhered to the barrier layer throughout the barrier layer of the overlay;

disposing the overlay over at least a portion of the seam, discontinuous barrier layer and outer structural layer of the wall;

heating to a temperature of at least about 200° C. the structural layer of the overlay and a confronting portion of the structural layer of the wall; and applying pressure of at least 5 psi to urge into engagement the heated structural layer of the overlay and the confronting heated portion of the structural layer of the wall to adhere and bond them together throughout the structural layer of the overlay.

2. The method of claim 1 wherein the overlay comprises polymeric inner and outer structural layers with the barrier layer disposed between and adhered to the inner and outer structural layers throughout the barrier layer of the overlay.

3. The method of claim 1 wherein the barrier layer of the overlay is an EVOH polymeric material.

4. The method of claim 1 wherein the barrier layer of the overlay is a metal material.

5. The method of claim 1 further comprising molding the structural layer of the overlay to at least a portion of the polymeric structural layer of the wall of the multi-layer tank during forming of the fuel tank.

6. The method of claim 1 wherein the structural layer of the overlay and the adjoining portion of the structural layer of the wall are heated to a temperature of about 200° C. to 270° C.

* * * * *